(12) United States Patent
Lee

(10) Patent No.: US 9,280,215 B2
(45) Date of Patent: Mar. 8, 2016

(54) POSITION TRACING SYSTEM USING ULTRASONIC WAVE

(71) Applicant: PenAndFree Co., Ltd., Seongnam-si, Gyeonggi-do (KR)

(72) Inventor: Jae Jun Lee, Seoul (KR)

(73) Assignee: PENANDFREE CO., LTD., Seongnam-Si, Gyeonggi-Do (KR)

( * ) Notice: Subject to any disclaimer, the term of this patent is extended or adjusted under 35 U.S.C. 154(b) by 451 days.

(21) Appl. No.: 13/948,590

(22) Filed: Jul. 23, 2013

(65) Prior Publication Data

US 2014/0028637 A1    Jan. 30, 2014

Related U.S. Application Data

(60) Provisional application No. 61/675,266, filed on Jul. 24, 2012.

(51) Int. Cl.
  G06F 3/033   (2013.01)
  G06F 3/0354  (2013.01)
  G06F 3/043   (2006.01)

(52) U.S. Cl.
  CPC ............ *G06F 3/03545* (2013.01); *G06F 3/043* (2013.01)

(58) Field of Classification Search
  None
  See application file for complete search history.

(56) References Cited

U.S. PATENT DOCUMENTS

| 2006/0290682 A1* | 12/2006 | Ake | G06F 3/0433 345/173 |
| 2011/0141067 A1* | 6/2011 | Misawa | G06F 3/0304 345/179 |
| 2012/0139863 A1* | 6/2012 | Lee | G06F 3/0488 345/173 |

FOREIGN PATENT DOCUMENTS

KR   10-0418423   2/2004

* cited by examiner

*Primary Examiner* — Nicholas Lee
(74) *Attorney, Agent, or Firm* — Kile Park Reed & Houtteman PLLC

(57) ABSTRACT

Provided is a position tracing system using ultrasonic wave, where a distance between ultrasonic wave reception sensors can be adjusted. A distance between ultrasonic wave reception sensors can be freely adjusted by user's manipulation, so that a position of a signal generation device implemented by an input pen can be more accurately traced by adjusting the distance between the ultrasonic wave reception sensors according to a size of a moving area of the signal generation device.

20 Claims, 9 Drawing Sheets

(a)

(b)

(c)

(a)

(b)

(a)

(b)

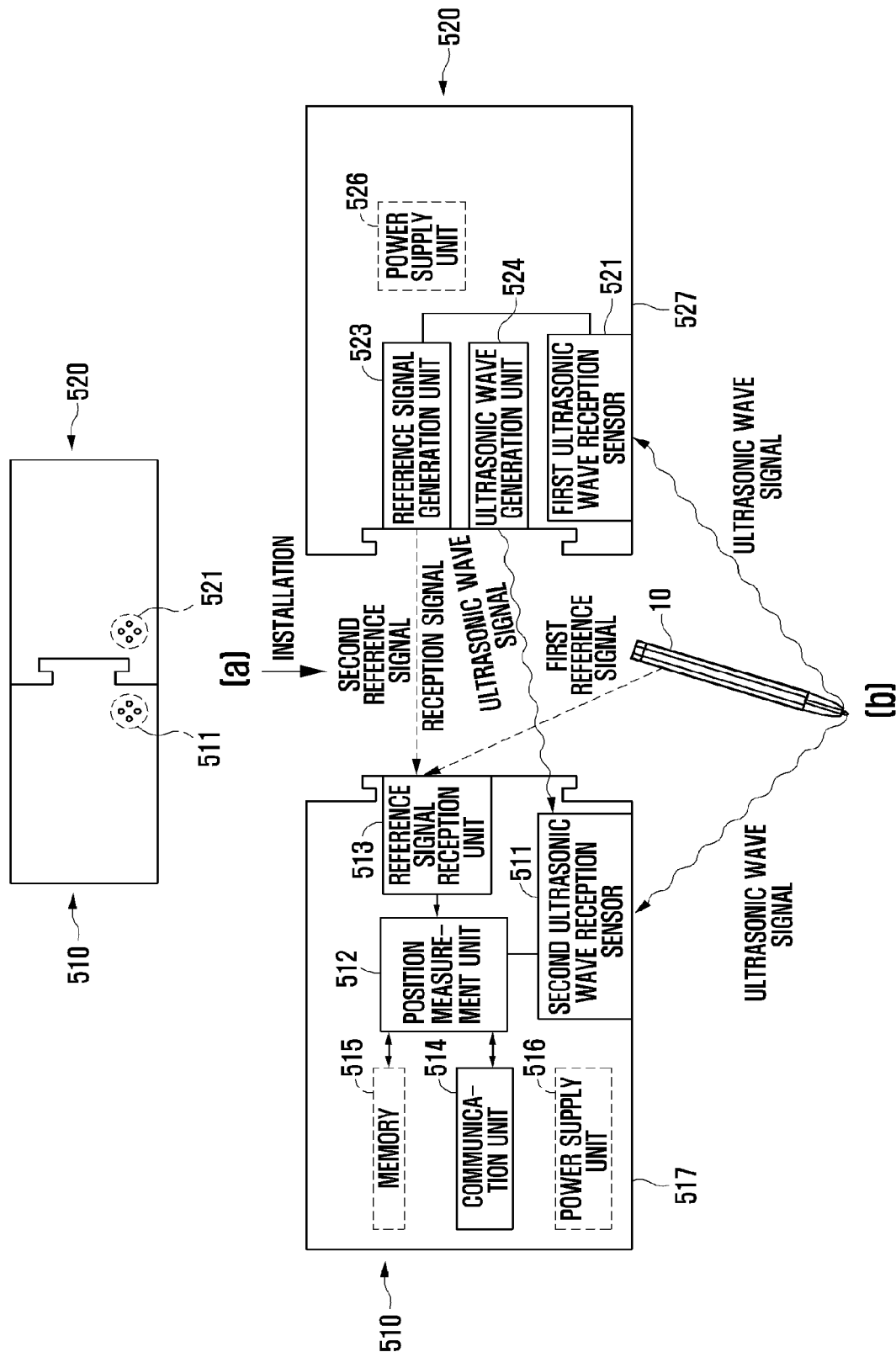

POSITION TRACING SYSTEM USING ULTRASONIC WAVE

CROSS-REFERENCE TO RELATED APPLICATION

This application claims the benefit of U.S. Provisional Application No. 61/675,266, filed on Jul. 24, 2012 in The United States Patent and Trademark Office, the disclosure of which is incorporated herein in its entirety by reference.

BACKGROUND OF THE INVENTION

1. Field of the Invention

The present invention relates to a position tracing system, and more particularly, to a position tracing system using ultrasonic wave.

2. Description of the Related Art

In the related art, a position tracing system which traces a position of an input pen generating an ultrasonic wave signal measures a distance between the input pen and each of two ultrasonic wave reception sensors by using a difference between reception times of the ultrasonic wave signal and a reference signal (for example, an infrared signal or an RF signal) generated by the input pen and measures the position of the input pen by using a predetermined distance between the ultrasonic wave reception sensors and the measured distance between the input pen and each of the ultrasonic wave reception sensors. An example of the position tracing system using an ultrasonic wave signal is disclosed in Korean Patent No. 10-0418423.

In the position tracing system in the related art, ultrasonic wave reception sensors which receive the ultrasonic waves may be included inside a single housing or fixed to a predetermined position, so that the distance between the ultrasonic wave reception sensors may be maintained constant.

In the case where the distance between the ultrasonic wave reception sensors has a fixed value, since an accurate value of the distance between the ultrasonic wave reception sensors is known, the length of one side among three sides of a triangle, which is constructed with an input pen and the two ultrasonic wave reception sensors, for calculating the position of the input pen is fixed as a constant value, so that there is an advantage in that the position tracing system can be used without calibration.

However, in the case where the ultrasonic wave reception sensors are installed inside one housing, there is a limitation in that the distance between the ultrasonic wave reception sensors cannot be increased so as for the housing to be easy to carry or install.

In the case where the distance between the ultrasonic wave reception sensors is small and a moving area of the input pen is wide, if the input pen generates the ultrasonic wave signal at a position far from the ultrasonic wave reception sensors, the triangle which is constructed with the input pen and the two ultrasonic wave reception sensors becomes an acute triangle having a very small acute angle. If the angle is small, an error occurring in the calculation is relatively large, so that an error caused by external environment factors is more greatly reflected.

Therefore, in the case where the input pen is located at the position far from the ultrasonic wave reception sensors, the error of coordinates is increased due to the external environment factors (wind, a change in temperature, or other factors changing the speed of ultrasonic wave), so that resolution of the position tracing system is deteriorated. In order to solve the above-described problem, the distance between the ultrasonic wave reception sensors may be set to be large so as to correspond to the size of the moving area of the input pen. However, if the distance between the ultrasonic wave reception sensors is increased, the entire size of the housing is also increased, so that the position tracing system is not easy to carry. Accordingly, in this case, there is a problem in that the distance between the ultrasonic wave reception sensors cannot be increased.

SUMMARY OF THE INVENTION

The present invention is to provide a position tracing system capable of more accurately tracing a position of a signal generation device by allowing a user to adjust a distance between ultrasonic wave reception sensors according to use environment.

According to an aspect of the present invention, there is provided a position tracing system including: a plurality of ultrasonic wave reception units where ultrasonic wave reception sensors receiving an ultrasonic wave signal generated by a signal generation device are installed; and a main body configured to include a position measurement unit which measures a position of the signal generation device or generates information for position measurement of the signal generation device by using a distance between the ultrasonic wave reception sensors installed in the ultrasonic wave reception units and a difference between reception times of the ultrasonic wave signal in the ultrasonic wave reception sensors and a main housing which contains the position measurement unit, wherein the ultrasonic wave reception units are coupled with the main housing so that the distance between the ultrasonic wave reception sensors included in the ultrasonic wave reception units can be adjusted by user's manipulation.

In the above aspect, the main housing may be configured to include a central portion which contains the position measurement unit and a pair of side portions which are connected to the central portion and where a plurality of fixing portions which are engaged with the ultrasonic wave reception units to fix the ultrasonic wave reception units are installed.

In addition, the side portions may be connected to the central portion by hinges.

In addition, when the ultrasonic wave reception unit is coupled with the fixing portion, the ultrasonic wave reception sensor installed in the ultrasonic wave reception unit may be electrically connected to the position measurement unit to transmit the received ultrasonic wave signal to the position measurement unit.

In addition, each of the fixing portions may be configured to include a sensing unit which senses whether or not the ultrasonic wave reception unit is coupled and which outputs a sensing signal to the position measurement unit, and the position measurement unit may measure the distance between the ultrasonic wave reception sensors by identifying the fixing portion which outputs the sensing signal.

In addition, fixing portions may be formed in a protruding shape at two ends of the main housing, and a first coupling portion and a second coupling portion which are engaged with the fixing portions to fix the ultrasonic wave reception unit to the main housing and to electrically connect the ultrasonic wave reception sensor to the position measurement unit may be installed at two ends of the ultrasonic wave reception unit, and the ultrasonic wave reception sensor is formed so as to be adjacent to the first coupling portion.

In addition, the position measurement unit may measure the distance between the ultrasonic wave reception sensors by identifying which one of the first and second coupling portions is engaged with the fixing portion.

In addition, a sensing unit which senses whether or not the first or second coupling portion may be coupled with the fixing portion and outputs a sensing signal to the position measurement unit is installed inside each of the first and second coupling portions or in the vicinity of each of the first and second coupling portions.

In addition, the ultrasonic wave reception units may be coupled with the main housing so as to be moved along guide rails installed in the main housing.

In addition, the main housing may be configured to include a central portion which contains the position measurement unit and a pair of side portions which are extended in the directions from the central portion toward the two sides of the main housing, and each of the ultrasonic wave reception units may be slidingly moved along guide rails installed in the side portions in the direction toward the central portion or in the opposite direction from the central portion.

In addition, sensing units which sense positions of the ultrasonic wave reception units may be installed at two ends of the side portions, and the position measurement unit may measure the distance between the ultrasonic wave reception sensors according to the sensing signals output from the sensing units.

In addition, each of the ultrasonic wave reception units may be connected to the position measurement unit in a wired manner to transmit the received ultrasonic wave signal to the position measurement unit.

In addition, one of the ultrasonic wave reception units may be integrally formed in the main housing, and the other ultrasonic wave reception unit may be allowed to be coupled with the main housing so as to be moved along a guide rail installed in the main housing.

In addition, sensing units which sense the position of the ultrasonic wave reception unit being moved along the guide rail may be installed at two ends of the guide rail, and the position measurement unit may measure the distance between the ultrasonic wave reception sensors according to sensing signals output from the sensing units.

In addition, the ultrasonic wave reception unit being moved along the guide rail may be connected to the position measurement unit in a wired manner to transmit the received ultrasonic wave signal to the position measurement unit.

According to another aspect of the present invention, there is provided a position tracing system including a main body module and an ultrasonic wave reception module which are detachably coupled with each other, wherein, in the state where the ultrasonic wave reception module is detached from the main body module, the ultrasonic wave reception module allows a first ultrasonic wave reception sensor to receive an ultrasonic wave signal generated by a signal generation device and transmits a reception signal indicating reception of the ultrasonic wave signal to the main body module, and the main body module measures a distance between the first ultrasonic wave reception sensor and a second ultrasonic wave reception sensor which is installed in the main body module to receive the ultrasonic wave signal generated by the signal generation device and measures a position of the signal generation device or generates information for position measurement of the signal generation device by using a difference between reception times of a first reference signal and the ultrasonic wave signal generated by the signal generation device in the main body module and a difference between reception time of the first reference signal in the main body module and reception time of the reception signal.

In the above aspect, the ultrasonic wave reception module may transmit a second reference signal and the ultrasonic wave signal to the main body module, and the main body module may measure the distance between the main body module and the ultrasonic wave reception module by using a difference between reception times of the second reference signal and the ultrasonic wave signal transmitted from the ultrasonic wave reception module so as to measure the distance between the first and second ultrasonic wave reception sensors.

In addition, in the case where the position of the signal generation device is not to be measured, a housing of the main body module and a housing of the ultrasonic wave reception module may be coupled with each other, and in the case where the position of the signal generation device is to be measured, the housing of the main body module and the housing of the ultrasonic wave reception module may be detached from each other and disposed so as for detached surfaces to face each other, and the position of the signal generation device is measured.

In addition, the ultrasonic wave reception module may be configured to include: the first ultrasonic wave reception sensor; an ultrasonic wave generation unit which generates an ultrasonic wave signal; a reference signal generation unit which generates a second reference signal for measuring the distance between the ultrasonic wave reception sensors; and an ultrasonic wave reception module housing, and the main body module may be configured to include: the second ultrasonic wave reception sensor which receives the ultrasonic wave signal generated by the ultrasonic wave generation unit and the ultrasonic wave signal generated by the signal generation device; a reference signal reception unit which receives the reception signal, the first reference signal, and the second reference signal; a position measurement unit which measures a distance between the first and second ultrasonic wave reception sensors by using the ultrasonic wave signal and the second reference signal generated by the ultrasonic wave reception module and which measures a position of the signal generation device or generates information for position measurement of the signal generation device by using a difference between reception times of the first reference signal and the ultrasonic wave signal generated by the signal generation device in the main body module and a difference between reception times of the first reference signal and the reception signal in the main body module; and a main body module housing which is detachably coupled with the ultrasonic wave reception module housing.

According to still another aspect of the present invention, there is provided a position tracing system comprising a main body module and an ultrasonic wave reception module which are detachably coupled with each other, wherein, in the state where the ultrasonic wave reception module is detached from the main body module, the ultrasonic wave reception module allows a first ultrasonic wave reception sensor to receive an ultrasonic wave signal generated by a signal generation device and transmits a reception signal indicating reception of the ultrasonic wave signal to the main body module, and the main body module measures a distance between the main body module and the ultrasonic wave reception module and measures a distance between the first ultrasonic wave reception sensor and a second ultrasonic wave reception sensor which is installed in the main body module to receive the ultrasonic wave signal generated by the signal generation device, and wherein the main body module measures a position of the signal generation device or generates information for position measurement of the signal generation device by using a difference between generation time of the reference signal generated by the main body module and reception time of the ultrasonic wave signal generated by the signal generation device receiving the reference signal in the second ultrasonic wave reception sensor and a difference between the generation time of the reference signal and the reception time of the reception signal.

According to the present invention, a distance between ultrasonic wave reception sensors can be freely adjusted by user's manipulation, so that a position of a signal generation device implemented by an input pen can be more accurately traced by adjusting the distance between the ultrasonic wave reception sensors according to a size of a moving area of the signal generation device.

BRIEF DESCRIPTION OF THE DRAWINGS

The above and other features and advantages of the present invention will become more apparent by describing in detail exemplary embodiments thereof with reference to the attached drawings in which:

FIG. 5A is a diagram illustrating a physical configuration of a position tracing system according to a fifth embodiment of the present invention.

DETAILED DESCRIPTION OF THE PREFERRED EMBODIMENTS

Hereinafter, exemplary embodiments of the present invention will be described with reference to the attached drawings.

Figure 1A:
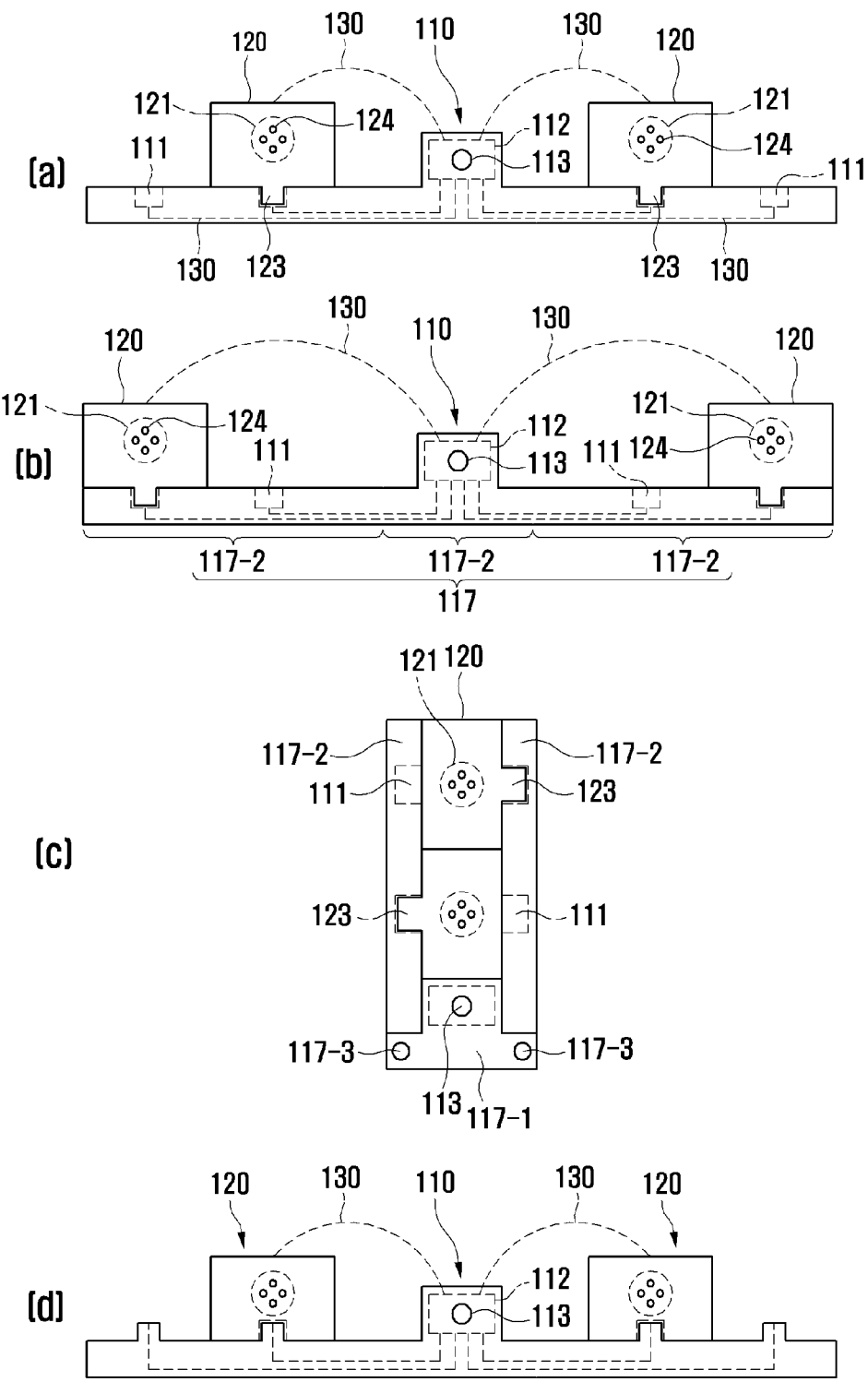
FIG. 1A is a diagram illustrating a physical configuration of a position tracing system according to a first embodiment of the present invention.
Figure 1B:
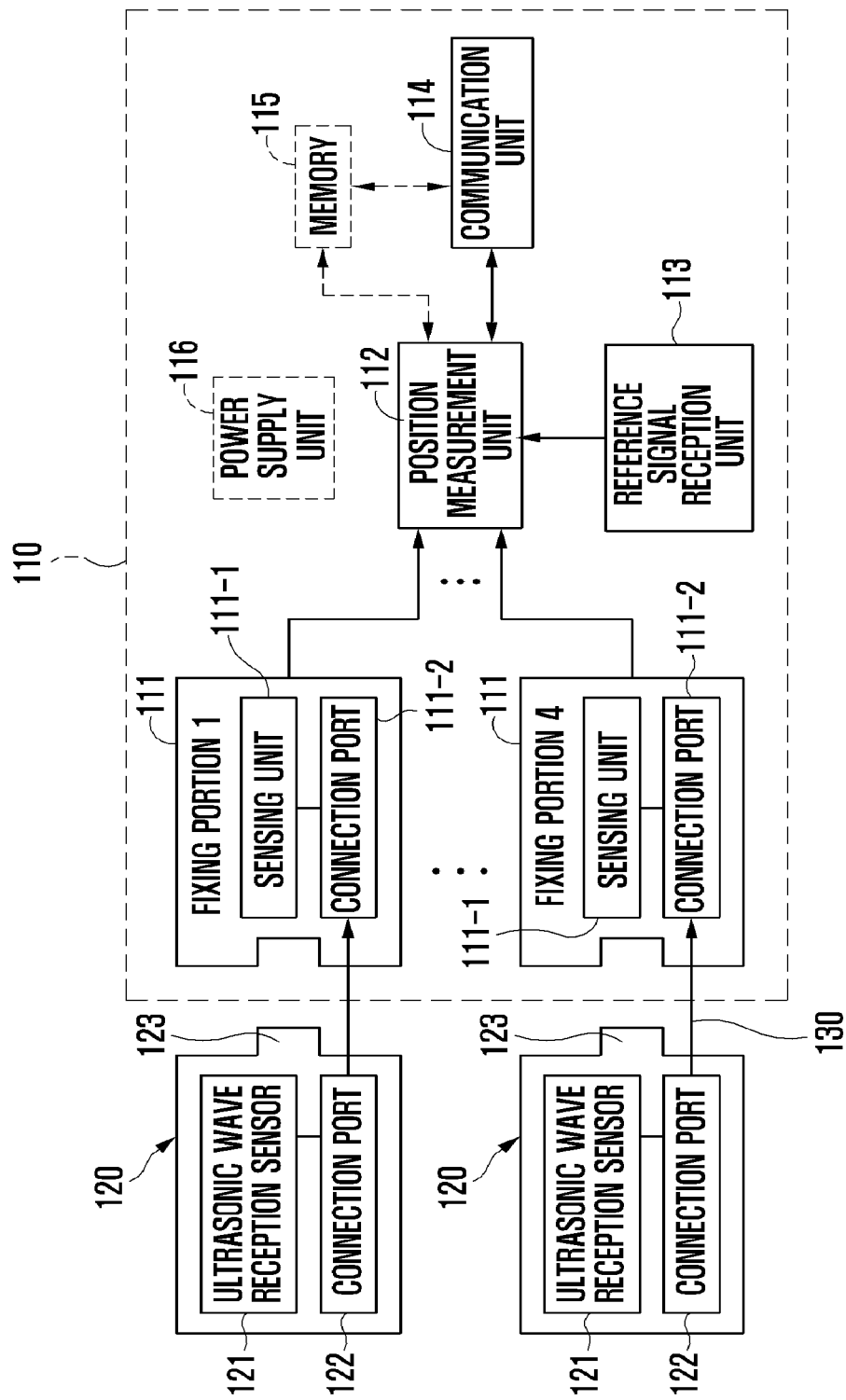
FIG. 1B is a block diagram illustrating a functional configuration of the position tracing system according to the first embodiment.

FIG. 1A is a diagram illustrating a physical configuration of a position tracing system according to a first embodiment of the present invention, and FIG. 1B is a block diagram illustrating a functional configuration of the position tracing system according to the first embodiment.

Referring to FIGS. 1A and 1B, the position tracing system according to the first embodiment of the present invention is configured to include a pair of ultrasonic wave reception units 120 and a main body 110 which the ultrasonic wave reception units 120 are coupled with.

First, coupling portions 123 having a shape corresponding to the fixing portion 11 are formed in a pair of the ultrasonic wave reception units 120 so as to be engaged with a plurality of fixing portions 111 installed in the main body 110. The coupling portions 123 and the fixing portions 111 are engaged with each other, the ultrasonic wave reception units 120 are coupled with the main body 110. If the fixing portion 111 is formed in a protruding shape, the coupling portion 123 may be formed in a recess shape so as to receive the protruding fixing portion 111. If the fixing portion 111 is formed in a recess shape, the coupling portion 123 may be formed in a protruding shape so as to be inserted into the fixing portion 111. (a) to (c) of FIG. 1A illustrate examples where the coupling portions 123 are formed in a protruding shape, and (d) of FIG. 1A illustrates an example where the fixing portions 111 are formed in a protruding shape.

Each ultrasonic wave reception unit 120 is configured to include an ultrasonic wave reception sensor 121 which receives an ultrasonic wave signal generated by a signal generation device (not shown) implemented by an input pen. If the ultrasonic wave reception sensor 121 receives the ultrasonic wave signal through a plurality of through-holes 124 formed on an outer housing, the ultrasonic wave reception sensor 121 transmits the received ultrasonic wave signal to a position measurement unit 112 included in the main body 110.

As illustrated by dotted lines of FIG. 1A, a pair of the ultrasonic wave reception units 120 is connected to the main body 110 through wired lines 130, so that the ultrasonic wave reception units 120 may be supplied with power-from the main body 110 and may directly output the received ultrasonic wave signal to the position measurement unit 112.

In the exemplary embodiment of the present invention, connection ports 122 are installed in the coupling portions 123 of the ultrasonic wave reception units 120. When the ultrasonic wave reception units 120 are engaged with the fixing portions 111, the connection port 122 of the coupling portion 123 and the connection port 111-2 installed in the fixing portion 111 are engaged with each other, and the ultrasonic wave reception sensors 121 are supplied with power from the main body 110, and ultrasonic wave reception sensors 121 transmit the ultrasonic wave signal to the position measurement unit 112 included in the main body 110.

On the other hand, the main body 110 is configured to include a reference signal reception unit 113 which receives a reference signal (for example, an infrared signal and an RF signal) generated by the signal generation device and outputs the reference signal to the position measurement unit 112 and the position measurement unit 112 which generates position information by measuring a position of the signal generation device by using a difference between reception time of the reference signal and reception time of the ultrasonic wave signal by each of the ultrasonic wave reception units 120 or generates information for position measurement of the signal generation device (for example, distance between the signal generation device and each of the ultrasonic wave reception sensors 121 and a distance between the ultrasonic wave reception sensors 121).

The main body 110 may be configured to further include a memory 115 which stores the position information or the information for position measurement generated by the position measurement unit 112 and a power supply unit 116 which supplies power to the main body 110 and the ultrasonic wave reception units 120. The power supply unit 116 may be implemented by a primary battery, a secondary battery, or the like.

The main body 110 may be configured to further include a communication unit 114 which can transmit the position information or the information for position measurement, which is input from the position measurement unit 112 in real time or stored in the memory 115, to an external electronic apparatus (for example, a tablet PC or a smart phone) in a wired or wireless manner. The communication unit 114 may be implemented by a Bluetooth communication module, an RF communication module, a USB connection module, or the like.

The above-described components of the main body 110 are installed inside a main housing 117. The main housing 117 includes a central portion 117-1 which includes the reference signal reception unit 113, the position measurement unit 112, the memory 115, the communication unit 114, and the power supply unit 116 and a pair of side portions 117-2 which are connected to the two sides of the central portion 117-1 and which include a plurality of the fixing portions 111 which are engaged with the ultrasonic wave reception units 120 to fix the positions of the ultrasonic wave reception units 120. As illustrated in (c) of FIG. 1A, the central portion 117-1 and the side portions 117-2 may be connected by hinges 117-3.

As described above, the fixing portion 111 installed in the side portion 117-2 may be formed in a recess shape or in a protruding shape. The fixing portion 111 is configured to include a sensing unit 111-1 and a connection port 111-2.

The sensing unit 111-1 included in each of the fixing portions 111 senses whether or not the ultrasonic wave reception units 120 are engaged with the fixing portion 111 and outputs a sensing signal to the position measurement unit 112. The position measurement unit 112 checks which fixing portion among a plurality of the fixing portions 111 outputs the sensing signal, so that the position measurement unit 112 can obtain the positions of the ultrasonic wave reception units 120 and measure an distance between the ultrasonic wave reception sensors 121. The sensing unit 111-1 may be implemented by a detector switch which is switched on by pressure when the coupling portion 123 of the ultrasonic wave reception unit 120 is engaged with the fixing portion 111 and outputs a switch-on signal as a sensing signal to the position measurement unit 112.

The connection port 111-2 included in each of the fixing portions 111 is allowed to be in contact with the connection port 122 of the ultrasonic wave reception unit 120, so that the ultrasonic wave reception sensors 121 and the position measurement unit 112 are electrically connected to each other and the ultrasonic wave reception sensors 121 are supplied with power from the main body 110. In the example illustrated in FIG. 1A, two fixing portions 111 are installed in each of the side portions 117-2. However, three or more fixing portions 111 may be installed according to a length of the side portion 117-2.

Operations of the position tracing system according to the first embodiment of the present invention will be described with reference to FIG. 1A. In the case where a moving area of the signal generation device is small, as illustrated in (a) of FIG. 1A, the ultrasonic wave reception units 120 are engaged with the fixing portions 111 close to the central portion 117-1 of the main housing 117, so that the distance between the ultrasonic wave reception sensors 121 is set to be short. On the other hand, in the case where the moving area of the signal generation device is large, as illustrated in (b) of FIG. 1A, the ultrasonic wave reception units 120 are engaged with the fixing portions 111 far from the central portion 117-1 of the main housing 117, so that the distance between the ultrasonic wave reception sensors 121 is set to be long. As illustrated in FIG. 1A, it can be understood by ordinarily skilled persons that, in the case where two fixing portions 111 are installed in each of the side portions 117-2, the distance between the ultrasonic wave reception sensors 121 may be set in three types.

If the ultrasonic wave reception units 120 are engaged with the fixing portions 111, the above-described sensing units 111-1 of the fixing portions 111 output sensing signals to the position measurement unit 112, and the position measurement unit 112 identifies the fixing portions 111 engaged with the ultrasonic wave reception units 120 to measure the distance between the ultrasonic wave reception sensors 121.

Next, if the signal generation device generates the reference signal and the ultrasonic wave signal, the reference signal is input through the reference signal reception unit 113 to the position measurement unit 112, and the ultrasonic wave signal is input through the ultrasonic wave reception units 120 to the position measurement unit 112. The position measurement unit 112 calculates the distance between the signal generation device and each of the ultrasonic wave reception sensors 121 by using the difference between the reception time of the reference signal and the reception time of the ultrasonic wave signal by each of the ultrasonic wave reception units 120.

In some embodiments, the position measurement unit 112 may store the distance between the ultrasonic wave reception sensors 121 and the distance between the signal generation device and each of the ultrasonic wave reception sensors 121 as information for position measurement in the memory 115 or transmit the distance between the signal generation device and each of the ultrasonic wave reception sensors 121 as information for position measurement through the communication unit 114 to an external electronic apparatus. In addition, the position measurement unit 112 may directly measure the position of the signal generation device to store the position of the signal generation device in the memory 115 or transmits the position of the signal generation device through the communication unit 114 to an external electronic apparatus.

On the other hand, when the use of the position tracing system is ended, as illustrated in (c) of FIG. 1A, the side portions 117-2 are allowed to be folded, so that the position tracing system can be easy to carry.

Figure 2A:
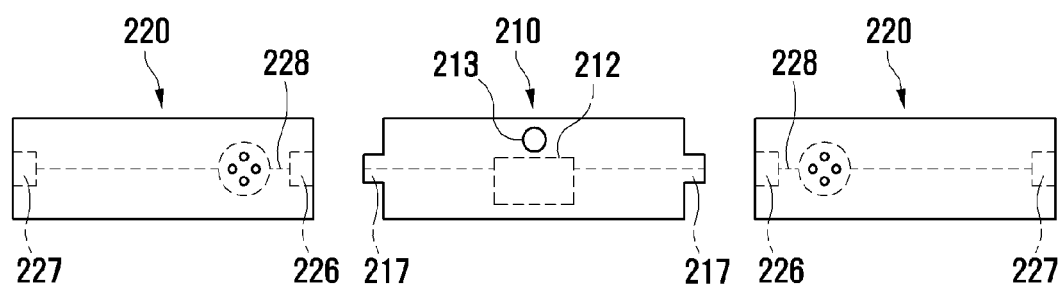
FIG. 2A is a diagram illustrating a physical configuration of a position tracing system according to a second embodiment of the present invention.
Figure 2A:
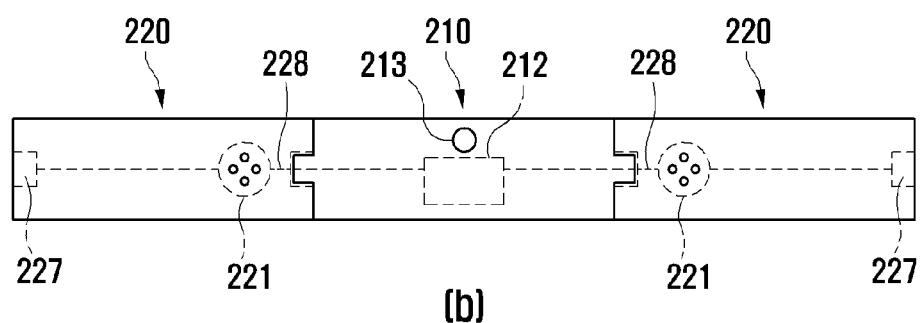
Figure 2A:
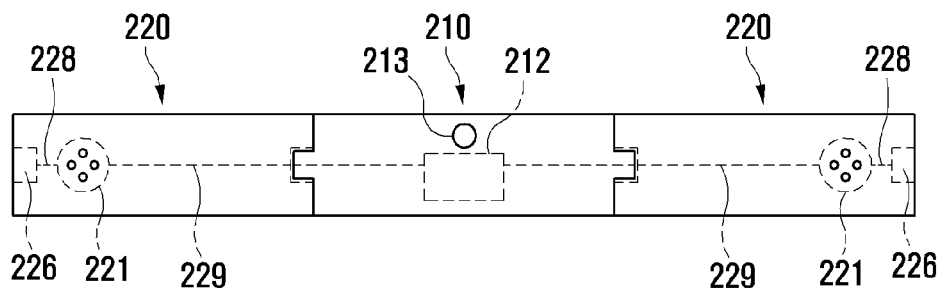
Figure 2B:
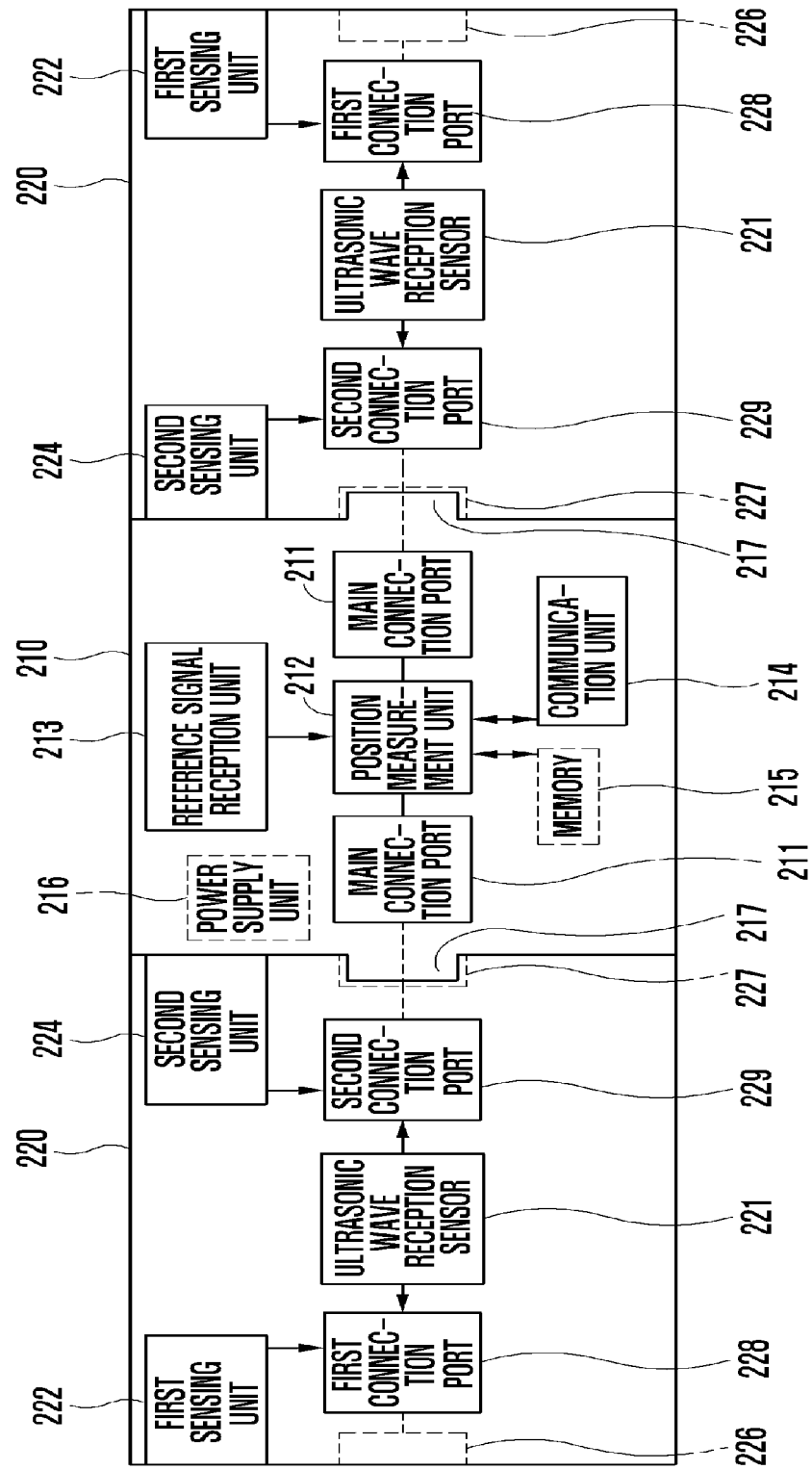
FIG. 2B is a block diagram illustrating a functional configuration of the position tracing system according to the second embodiment.

FIG. 2A is a diagram illustrating a physical configuration of a position tracing system according to a second embodiment of the present invention, and FIG. 2B is a block diagram illustrating a functional configuration of the position tracing system according to the second embodiment.

Referring to FIGS. 2A and 2B, the position tracing system according to the second embodiment of the present invention is configured to include a main body 210 and a pair of ultrasonic wave reception units 220 which are coupled with two ends of the main body 210.

Fixing portions 217 are formed in a protruding shape at the two ends of the main body 210. A first coupling portion 226 and a second coupling portion 227 which are engaged with the fixing portions 217 to fix each of the ultrasonic wave reception units 220 to the main body 210 and to electrically connect each of ultrasonic wave reception sensors 221 to a position measurement unit 212 of the main body 210 are formed at two ends of each of the ultrasonic wave reception units 220. Each of the ultrasonic wave reception sensors 221 is formed so as to be adjacent to the first coupling portion 226.

The first coupling portion 226 of the ultrasonic wave reception unit 220 is installed so as to be connected to a first connection port 228, and a first sensing unit 222 which senses whether or not the first coupling portion 226 is engaged with the fixing portion 217 and outputs a sensing signal through the first connection port 228 to the position measurement unit 212 is installed in the vicinity of the first coupling portion 226 or inside the first coupling portion 226.

In addition, the second coupling portion 227 is installed so as to be connected to the second connection port 229, and a second sensing unit 224 which senses whether or not the second coupling portion 227 is engaged with the fixing portion 217 and outputs a sensing signal through the second connection port 229 to the position measurement unit 212 is installed in the vicinity of the second coupling portion 227 or inside the second coupling portion 227.

Similarly to the first embodiment, each of the first and second sensing units 222 and 224 may be implemented by a detector switch which can transmit as switch-on signal as a sensing signal to the position measurement unit 212 when the ultrasonic wave reception unit 220 is coupled with the main body 210.

In addition, each of the ultrasonic wave reception sensors 221 is installed so as to be connected to the first connection port 228 and the second connection port 229 and to be adjacent to the first coupling portion 226, so that the distance between the ultrasonic wave reception sensors 221 can be adjusted according to which one of the first and second coupling portions 226 and 227 is allowed to be engaged with the fixing portion 217.

The fixing portions 217 are formed in a protruding shape at the two ends of the main body 210, and main connection ports 211 of the main body 210 are electrically connected through the fixing portions 217 to the first connection port 228 or the second connection port 229 of the ultrasonic wave reception units 220.

The main body 210 is configured to include the main connection ports 211 installed at the two ends thereof, a memory 215, a communication unit 214, a reference signal reception unit 213, a power supply port 216, and a position measurement unit 212. Herein, since the functions of the memory 215, the communication unit 214, the reference signal reception unit 213, and the power supply port 216 are the same as those of the above-described first embodiment, detailed description thereof is omitted.

The position measurement unit 212 identifies which one of the first and second coupling portions 226 and 227 of each of the ultrasonic wave reception units 220 is engaged with the fixing portion 217 by using sensing signals received by the ultrasonic wave reception units 220 coupled with the two sides of the main body 210, so that the position measurement unit 212 obtains the positions of the ultrasonic wave reception sensors 221 and the distance between the ultrasonic wave reception sensors 221.

When the signal generation device (not shown) generates a reference signal and an ultrasonic wave signal simultaneously, the reference signal is received by the reference signal reception unit 213, and the ultrasonic wave signal is received by the ultrasonic wave reception sensors 221.

The position measurement unit 212 receives the ultrasonic wave signals from the ultrasonic wave reception sensors 221 through the main connection ports 211 and measures the distance between the signal generation device and each of the ultrasonic wave reception sensors 221 by using a difference between the reception time of the reference signal and the reception time of the ultrasonic wave signal by each of the ultrasonic wave reception sensors 221. Similarly to the above-described first embodiment, the position measurement unit 212 may store position information generated by measuring the position of the signal generation device or information for position measurement in the memory 215 or may transmit the position information or the information for position measurement through the communication unit 214 to an external electronic apparatus (not shown).

Operations of the position tracing system according to the second embodiment of the present invention will be described with reference to FIG. 2A. In the case where a moving area of the signal generation device is small, as illustrated in (b) of FIG. 2A, the first coupling portion 226 is engaged with the fixing portion 217, so that the distance between the ultrasonic wave reception sensors 221 is set to be short. On the other hand, in the case where the moving area of the signal generation device is large, as illustrated in (c) of FIG. 2A, the second coupling portion 227 is engaged with the fixing portion 217, so that the distance between the ultrasonic wave reception sensors 221 is set to be long. It can be understood by ordinarily skilled persons that the one of the ultrasonic wave reception units 220 is allowed to be engaged with the first coupling portion 226 and the fixing portion 217, and the other is allowed to be engaged with the second coupling portion 227 and the fixing portion 217, so that the distance between the ultrasonic wave reception sensors 221 may be set in three types.

Figure 3A:
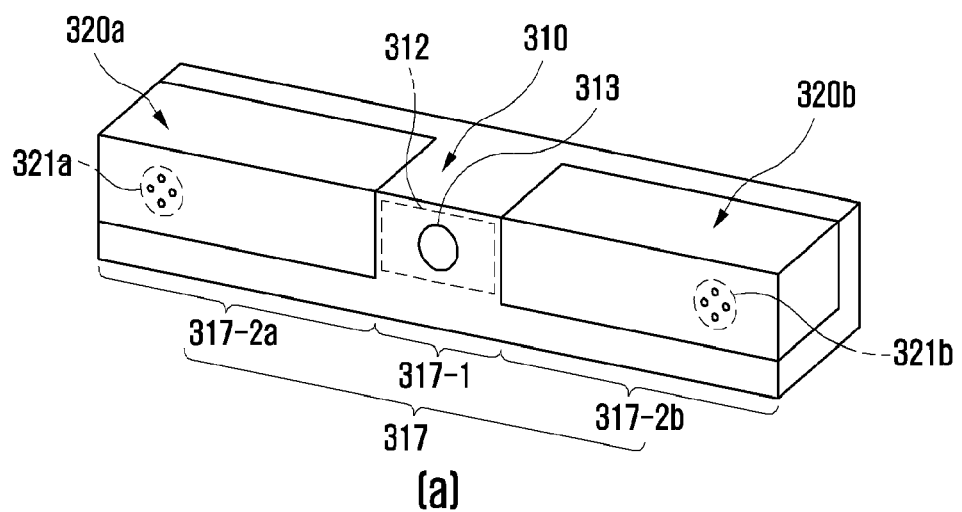
FIG. 3A is a diagram illustrating a physical configuration of a position tracing system according to a third embodiment of the present invention.
Figure 3A:
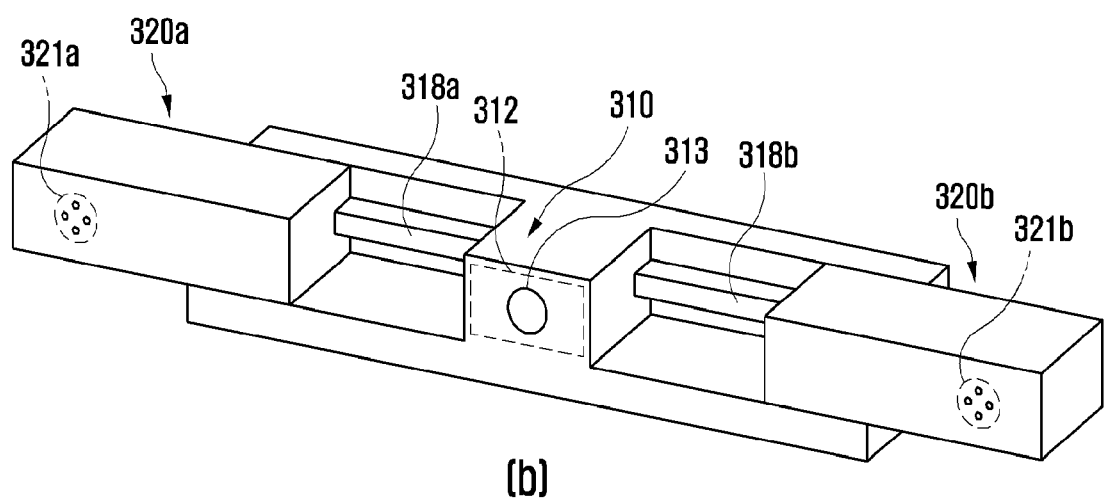
Figure 3B:
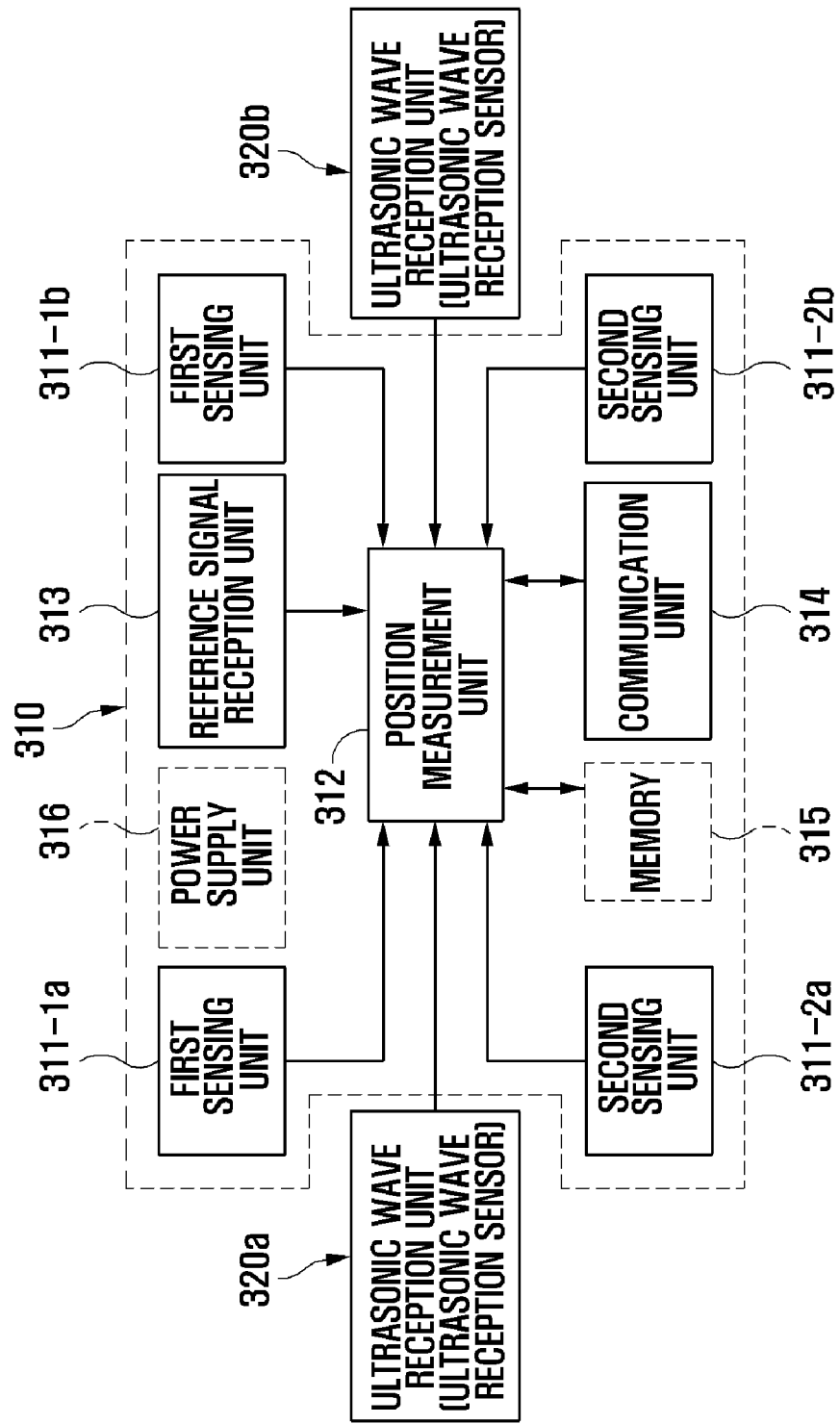
FIG. 3B is a block diagram illustrating a functional configuration of the position tracing system according to the third embodiment.

FIG. 3A is a diagram illustrating a physical configuration of a position tracing system according to a third embodiment of the present invention, and FIG. 3B is a block diagram illustrating a functional configuration of the position tracing system according to the third embodiment.

Referring to FIGS. 3A and 3B, the position tracing system according to the third embodiment of the present invention is configured to include a main body 310 and a pair of ultrasonic wave reception units 320a and 320b which are coupled with the main body 310 so as to be moved along guide rails 318a and 318b installed in a main housing 317 of the main body 310.

A sliding groove which is engaged with each of the guide rails 318a and 318b so as to move the ultrasonic wave reception units 320a and 320b along the guide rail 318 is formed in the housing of each of the ultrasonic wave reception units 320a and 320b. Therefore, each of the ultrasonic wave reception units 320a and 320b can be slidingly moved in the direction toward the central portion 317-1 of the main housing 317 or in the opposite direction from the central portion 317-1 of the main housing 317 by user's manipulation. Ultrasonic wave reception sensors 321a and 321b installed in the ultrasonic wave reception units 320a and 320b are connected to the position measurement unit 312 included in the main housing 317, which is implemented by an FPCB (Flexible Printed Circuit Board) or the like, to output ultrasonic wave signals received through through-holes formed in the housings of the ultrasonic wave reception units 320a and 320b to the position measurement unit 312.

The main housing 317 of the main body 310 is configured to include the central portion 317-1 and a pair of side portions 317-2a and 317-2b which are extended from the central portion 317-1. The central portion 317-1 includes a power supply unit 316, a reference signal reception unit 313, a memory 315, a communication unit 314, and the position measurement unit 312. The guide rails 318a and 318b which guide the ultrasonic wave reception units 320 to be moved are formed in the side portions 317-2a and 317-2b. Sensing units which sense positions of the ultrasonic wave reception units 320a and 320b to output sensing signals are installed at two ends of each of the guide rails 318a and 318b. As described above, the sensing unit may be implemented by a detector switch. The sensing units installed close to the central portion 317-1 are referred to as first sensing units 311-1a and 311-1b, and the sensing units installed far from the central portion 317-1 are referred to as second sensing units 311-2a and 311-2b.

The functions of the power supply unit 316, the reference signal reception unit 313, the memory 315, and the communication unit 314 are the same as those of the above-described first and second embodiments.

The position measurement unit 312 identifies positions of the ultrasonic wave reception units 320a and 320b by using the sensing signals received by the first sensing units 311-1a and 311-1b and the second sensing units 311-2a and 311-2b installed in the side portions 317-2a and 317-2b to measure the positions of the ultrasonic wave reception sensors 321a and 321b and the distance between the ultrasonic wave reception sensors 321a and 321b.

For example, if the sensing signals are input from the first sensing units 311-1a and 311-1b installed in the side portions 317-2a and 317-2b, as illustrated in (a) of FIG. 3A, the position measurement unit 312 determines that the ultrasonic wave reception units 320a and 320b are disposed, so that the distance between the ultrasonic wave reception sensors 321a and 321b can be measured. If the sensing signals are input from the second sensing units 311-2a and 311-2b installed in the side portions 317-2a and 317-2b, as illustrated in (b) of FIG. 3A, the position measurement unit 312 determines that the ultrasonic wave reception units 320a and 320b are disposed, so that the distance between the ultrasonic wave reception sensors 321a and 321b can be measured.

In addition, it can be understood by ordinarily skilled persons that one of the ultrasonic wave reception units 320a and 320b is allowed to be in close contact with the central portion 317-1 and the other is allowed to be moved in the opposite direction from the central portion 317-1, so that the distance between the ultrasonic wave reception sensors 321 may be set in three types.

If the distance between the ultrasonic wave reception sensors 321a and 321b is measured, the position measurement unit 312 receives the ultrasonic wave signals from the ultrasonic wave reception units 320a and 320b and measure the distance between the signal generation device and each of the ultrasonic wave reception sensors 321a and 321b by using a difference between the reception time of the reference signal and the reception time of the ultrasonic wave signal by each of the ultrasonic wave reception units 320a and 320b. Similarly to the above-described first and second embodiments, the position measurement unit 312 may store position information generated by measuring the position of the signal generation device or information for position measurement in the memory 315 or may transmit the position information or information for position measurement through the communication unit 314 to an external electronic apparatus.

Figure 4:
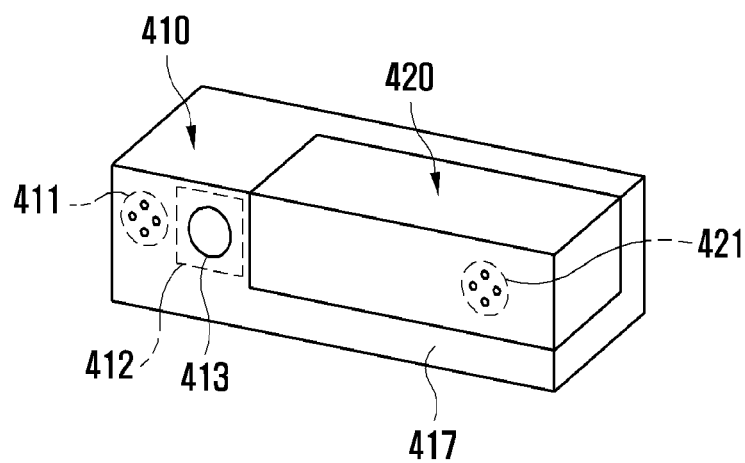
FIG. 4 is a diagram illustrating a physical configuration of a position tracing system according to a fourth embodiment of the present invention.
Figure 4:
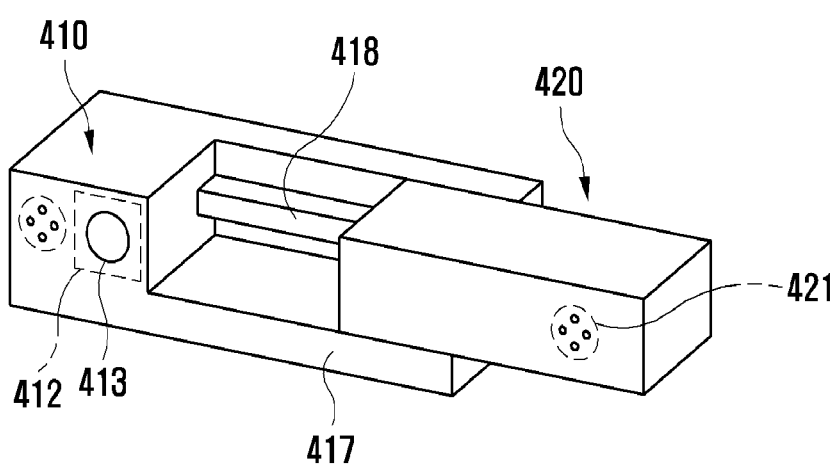

FIG. 4 is a diagram illustrating a physical configuration of a position tracing system according to a fourth embodiment of the present invention.

In the fourth embodiment illustrated in FIG. 4, unlike the third embodiment where the ultrasonic wave reception units are independently used, one of ultrasonic wave reception units 420 is integrally formed in a main body 410, and similarly to the third embodiment, the other is allowed to be coupled with the main housing 417 so as to be moved along a guide rail installed in the main housing 417.

Therefore, in the example illustrated in FIG. 4, the ultrasonic wave reception sensor 321a installed at the side portion 317-2a of the left side of FIG. 3A is installed in the central portion 317-1, and the first sensing unit 311-1a and the second sensing unit 311-2a illustrated in FIG. 3B are omitted. The other configurations of the example illustrated in FIG. 4 are the same as those of the third embodiment. As a result, the first sensing unit 311-1b and the second sensing unit 311-2b illustrated in FIG. 3B are installed at the two ends of the guide rail 418.

Operations of the position tracing system according to the fourth embodiment of the present invention will be described. In the case where the moving area of the signal generation device is small, as illustrated in (a) of FIG. 4, the ultrasonic wave reception unit 420 is allowed to be in close contact with the central portion, so that the distance between the ultrasonic wave reception sensors 411 and 421 is set to be short. In the case where the moving area of the signal generation device is large, as illustrated in (b) of FIG. 4 의 (b), the ultrasonic wave reception unit 420 is allowed to be separated far from the central portion, so that the distance between the ultrasonic wave reception sensors 411 and 421 is set to be long.

Next, when the signal generation device (not shown) generates a reference signal and an ultrasonic wave signal simultaneously, the reference signal is received by the reference signal reception unit 413, and the ultrasonic wave signal is received by the ultrasonic wave reception sensors 411 and 421. The position measurement unit 412 measures the distance between the ultrasonic wave reception sensors 411 and 421 and the distance between the signal generation device and each of the ultrasonic wave reception sensors 411 and 421 by using the same method as the third embodiment and generates position information by directly measuring the position of the signal generation device or generates information for position measurement.

Figure 5B:
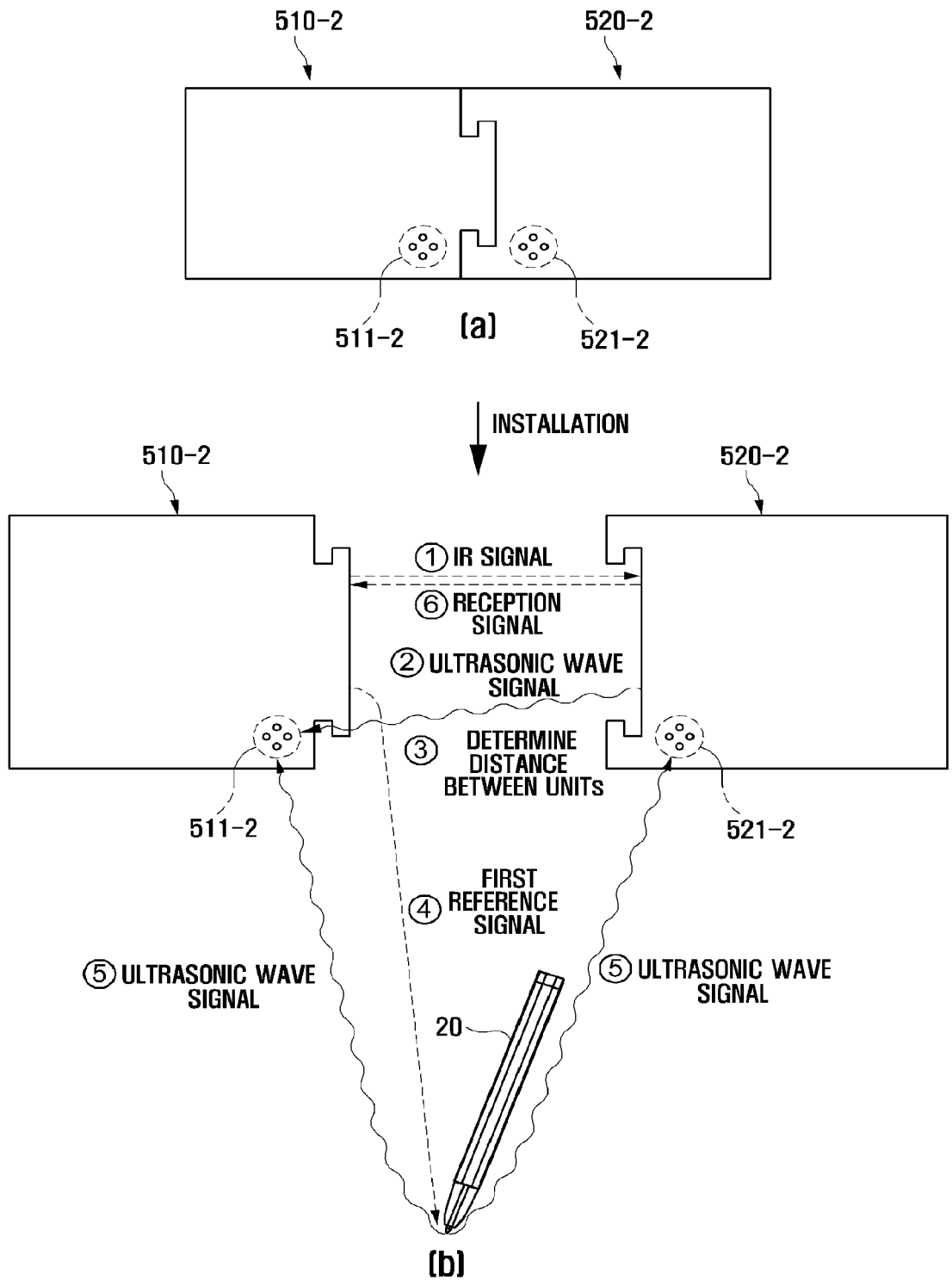
FIG. 5B is a diagram illustrating a modified example of the position tracing system according to the fifth embodiment.

FIG. 5A is a diagram illustrating a physical configuration of a position tracing system according to a fifth embodiment of the present invention, and FIG. 5B is a diagram illustrating a modified example of the position tracing system according to the fifth embodiment.

First, referring to FIG. 5A, the position tracing system according to the fifth embodiment of the present invention is configured to include a main body module 510 and an ultrasonic wave reception module 520 which are detachably coupled with each other.

As illustrated in (a) of FIG. 5A, at a normal time, the position tracing system according to the fifth embodiment is carried in the state where the main body module 510 and the ultrasonic wave reception module 520 are coupled with each other. On the other hand, as illustrated in (b) of FIG. 5A, when the position tracing system is used to trace a position of a signal generation device 10, the main body module 510 and the ultrasonic wave reception module 520 are detached from each other so as for the coupling surfaces to face each other, and the tracing of the position of the signal generation device 10 is performed.

Detailed configurations of the ultrasonic wave reception module 520 and the main body module 510 will be described with reference to (b) of FIG. 5A.

The ultrasonic wave reception module 520 is configured to include a first ultrasonic wave reception sensor 521 which receives an ultrasonic wave signal generated by the signal generation device 10, an ultrasonic wave generation unit 524 and a reference signal generation unit 523 which generates an ultrasonic wave signal and a second reference signal for measuring a distance between the ultrasonic wave reception module 520 and the main body module 510, and a power supply unit 526 which supplies power to components of the ultrasonic wave reception module 520. The components are included inside an ultrasonic wave reception module housing 527. The ultrasonic wave generation unit 524 and the reference signal generation unit 523 are installed on the contact surface of the ultrasonic wave reception module 520 which is in contact with the main body module housing 517. The first ultrasonic wave reception sensor 521 is installed in the direction toward the signal generation device 10.

When the first ultrasonic wave reception sensor 521 receives the ultrasonic wave signal from the signal generation device 10, the reference signal generation unit 523 of the ultrasonic wave reception module 520 immediately generates a reception signal and transmits the reception signal to the main body module 510 in order to notify the main body module 510 of the reception of the ultrasonic wave signal.

The main body module 510 is configured to include a second ultrasonic wave reception sensor 511 which receives the ultrasonic wave signal generated by the signal generation device 10 and the ultrasonic wave signal generated by the ultrasonic wave reception module 520, a reference signal reception unit 513 which receives a first reference signal generated by the signal generation device 10 and a second reference signal and a reception signal generated by the ultrasonic wave reception module 520, a memory 515, a communication unit 514, a power supply unit 516, and a position measurement unit 512. The reference signal reception unit 513 is installed on the contact surface of the main body module 510 which is in contact with the ultrasonic wave reception module housing 527.

The position measurement unit 512 measures the distance between the main body module 510 and the ultrasonic wave reception module 520 by using a difference between the reception times of the ultrasonic wave signal and the second reference signal which are simultaneously generated by the ultrasonic wave reception module 520 and adds predetermined separation distances of the first ultrasonic wave reception sensor 521 and the second ultrasonic wave reception sensor 511 from the contact surface to the distance between the main body module 510 and the ultrasonic wave reception module 520, so that the distance between the first ultrasonic wave reception sensor 521 and the second ultrasonic wave reception sensor 511 is measured. The measurement of the distance between the ultrasonic wave reception module 520 and the main body module 510 may be performed by user's manipulation, or the measurement may be performed at a certain time interval or for an idle period where the first reference signal is not input from the signal generation device 10.

The position measurement unit 512 measures the distance between the signal generation device 10 and the second ultrasonic wave reception sensor 511 by using a difference between the reception times of the first reference signal and the ultrasonic wave signal generated by the signal generation device 10 in each of the reference signal reception unit 513 and the second ultrasonic wave reception sensor 511.

In addition, the position measurement unit 512 measures the distance between the signal generation device 10 and the first ultrasonic wave reception sensor 521 by using a difference between the reception time of the first reference signal generated by the signal generation device 10 in the reference signal reception unit 513 and the reception time of the reception signal generated by the reference signal generation unit 523 of the ultrasonic wave reception module 520 in the reference signal reception unit 513. The first reference signal, the second reference signal, and the reception signal are encoded so as to be identified.

Similarly to the first to fourth embodiments, the position measurement unit 512 may store the distance between the signal generation device 10 and each of the first ultrasonic wave reception sensor 521 and the second ultrasonic wave reception sensor 511 and the distance between the first ultrasonic wave reception sensor 521 and the second ultrasonic wave reception sensor 511 as information for position measurement in the memory 515 or may transmit the above-described distances through the communication unit 514 to an external electronic apparatus. The position measurement unit 512 may directly measure the position of the signal generation device 10 by using the above-described distances and store the position information in the memory 515 or transmit the position information through the communication unit 514 to an external electronic apparatus.

The components of the main body module 510 are installed inside the main body module housing 517. The main body module housing 517 is formed so as to be detachably coupled with the ultrasonic wave reception module housing 527. Various methods of detachably coupling the main body module housing 517 with the ultrasonic wave reception module housing 527 can be used. As an example, a magnet may be used for the detachably coupling. In addition, as illustrated in FIG. 5A, a concave portion is formed in the one housing, and a groove portion is formed in the other housing, so that the housings can be detachably coupled with each other.

In the embodiment illustrated in FIG. 5A, the reference signal reception unit 513 installed in the main body module 510 is configured to receive the first reference signal generated by the signal generation device 10 and the second reference signal and the reception signal generated by the ultrasonic wave reception module 520. However, the reference signal reception unit 513 may be configured to receive the second reference signal and the reception signal generated by the ultrasonic wave reception module 520, and a reference signal reception unit (not shown) which receives the first reference signal generated by the signal generation device 10 may be further formed on the surface where the second ultrasonic wave reception sensor is formed. In this case, an infrared signal may be used for the first reference signal, and an RF signal may be used for the second reference signal and the reception signal.

FIG. 5B is a diagram illustrating a modified example of the position tracing system according to the fifth embodiment. Referring to FIG. 5B, a main body module 510-2 transmits a second reference signal (for example, an infrared signal) to an ultrasonic wave reception module 520-2 in order to measure a distance between the main body module 510-2 and the ultrasonic wave reception module 520-2, and the ultrasonic wave reception module 520-2 receiving the second reference signal immediately transmits an ultrasonic wave signal to the main body module 510-2, so that the distance between the main body module 510-2 and each of the ultrasonic wave reception sensors 511-2 and 521-2 installed in the ultrasonic wave reception module 520-2 is measured.

Next, the main body module 510-2 transmits a first reference signal to a signal generation device 20 at a predetermined time period, and the signal generation device 20 receiving the first reference signal immediately generates an ultrasonic wave signal. The ultrasonic wave signal is received by the main body module 510-2 and the ultrasonic wave reception sensors 511-2 and 521-2 installed in the ultrasonic wave reception module 520-2.

When the ultrasonic wave signal is received by the ultrasonic wave reception sensor 521-2, the ultrasonic wave reception module 520-2 immediately transmits a reception signal (for example, an infrared signal or an RF signal) to the main body module 510-2, so that the reception time of the ultrasonic wave signal in the ultrasonic wave reception module 520-2 is noticed to the main body module 510.

A position measurement unit (not shown) installed in the main body module 510-2 measures the distance between the signal generation device 20 and each of the ultrasonic wave reception sensors 511-2 and 521-2 installed in the ultrasonic wave reception module by using a difference between generation time of the first reference signal generated by the main body module 510-2 and each of the reception times of the ultrasonic wave signal in the main body module 510-2 and the ultrasonic wave reception module 520-2.

Next, similarly to the first to fourth embodiments, the position measurement unit (not shown) may store the distance between the signal generation device 20 and each of the first and second ultrasonic wave reception sensors 521-2 and 511-2 and the distance between the first and second ultrasonic wave reception sensors 521-2 and 511-2 as information for position measurement in a memory (not shown) or may transmit the information for position measurement through a communication unit (not shown) to an external electronic apparatus. In addition, the position measurement unit may directly measure a position of the signal generation device 20 by using the above-described distances to store the position information in the memory or to transmit the position information through a communication unit to an external electronic apparatus. In the modified example illustrated in FIG. 5B, the reference signal, the reception signal, and the infrared signal may be encoded so as to be identified.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A position tracing system comprising:
   a plurality of ultrasonic wave reception units where ultrasonic wave reception sensors receiving an ultrasonic wave signal generated by a signal generation device are installed; and
   a main body configured to include a position measurement unit which measures a position of the signal generation device or generates information for position measurement of the signal generation device by using a distance between the ultrasonic wave reception sensors installed in the ultrasonic wave reception units and a difference between reception times of the ultrasonic wave signal in the ultrasonic wave reception sensors and a main housing which contains the position measurement unit,
   wherein the ultrasonic wave reception units are coupled with the main housing so that the distance between the ultrasonic wave reception sensors included in the ultrasonic wave reception units can be adjusted by user's manipulation.

2. The position tracing system according to claim 1, wherein the main housing is configured to include:
   a central portion which contains the position measurement unit; and
   a pair of side portions which are connected to the central portion and where a plurality of fixing portions which are engaged with the ultrasonic wave reception units to fix the ultrasonic wave reception units are installed.

3. The position tracing system according to claim 2, wherein the side portions are connected to the central portion by hinges.

4. The position tracing system according to claim 2, wherein, when the ultrasonic wave reception unit is coupled with the fixing portion, the ultrasonic wave reception sensor installed in the ultrasonic wave reception unit is electrically connected to the position measurement unit to transmit the received ultrasonic wave signal to the position measurement unit.

5. The position tracing system according to claim 4,
   wherein each of the fixing portions is configured to include a sensing unit which senses whether or not the ultrasonic wave reception unit is coupled and which outputs a sensing signal to the position measurement unit, and
   wherein the position measurement unit measures the distance between the ultrasonic wave reception sensors by identifying the fixing portion which outputs the sensing signal.

6. The position tracing system according to claim 1,
   wherein fixing portions are formed in a protruding shape at two ends of the main housing, and
   wherein a first coupling portion and a second coupling portion which are engaged with the fixing portions to fix the ultrasonic wave reception unit to the main housing and to electrically connect the ultrasonic wave reception sensor to the position measurement unit are installed at two ends of the ultrasonic wave reception unit, and the ultrasonic wave reception sensor is formed so as to be adjacent to the first coupling portion.

7. The position tracing system according to claim 6, wherein the position measurement unit measures the distance between the ultrasonic wave reception sensors by identifying which one of the first and second coupling portions is engaged with the fixing portion.

8. The position tracing system according to claim 7, wherein a sensing unit which senses whether or not the first or second coupling portion is coupled with the fixing portion and outputs a sensing signal to the position measurement unit is installed inside each of the first and second coupling portions or in the vicinity of each of the first and second coupling portions.

9. The position tracing system according to claim 1, wherein the ultrasonic wave reception units are coupled with the main housing so as to be moved along guide rails installed in the main housing.

10. The position tracing system according to claim 9,
    wherein the main housing is configured to include:
    a central portion which contains the position measurement unit; and
    a pair of side portions which are extended in the directions from the central portion toward the two sides of the main housing, and
    wherein each of the ultrasonic wave reception units is slidingly moved along guide rails installed in the side portions in the direction toward the central portion or in the opposite direction from the central portion.

11. The position tracing system according to claim 10, wherein sensing units which sense positions of the ultrasonic wave reception units are installed at two ends of the side portions, and the position measurement unit measures the distance between the ultrasonic wave reception sensors according to the sensing signals output from the sensing units.

12. The position tracing system according to claim 10, wherein each of the ultrasonic wave reception units is connected to the position measurement unit in a wired manner to transmit the received ultrasonic wave signal to the position measurement unit.

13. The position tracing system according to claim 1, wherein one of the ultrasonic wave reception units is integrally formed in the main housing, and the other ultrasonic wave reception unit is allowed to be coupled with the main housing so as to be moved along a guide rail installed in the main housing.

14. The position tracing system according to claim 13, wherein sensing units which sense the position of the ultrasonic wave reception unit being moved along the guide rail are installed at two ends of the guide rail, and the position measurement unit measures the distance between the ultrasonic wave reception sensors according to sensing signals output from the sensing units.

15. The position tracing system according to claim 10, wherein the ultrasonic wave reception unit being moved along the guide rail is connected to the position measurement unit in a wired manner to transmit the received ultrasonic wave signal to the position measurement unit.

16. A position tracing system comprising a main body module and an ultrasonic wave reception module which are detachably coupled with each other,
> wherein, in the state where the ultrasonic wave reception module is detached from the main body module, the ultrasonic wave reception module allows a first ultrasonic wave reception sensor to receive an ultrasonic wave signal generated by a signal generation device and transmits a reception signal indicating reception of the ultrasonic wave signal to the main body module, and the main body module measures a distance between the first ultrasonic wave reception sensor and a second ultrasonic wave reception sensor which is installed in the main body module to receive the ultrasonic wave signal generated by the signal generation device and measures a position of the signal generation device or generates information for position measurement of the signal generation device by using a difference between reception times of a first reference signal and the ultrasonic wave signal generated by the signal generation device in the main body module and a difference between reception time of the first reference signal in the main body module and reception time of the reception signal.

17. The position tracing system according to claim 16,
> wherein the ultrasonic wave reception module transmits a second reference signal and the ultrasonic wave signal to the main body module, and
> wherein the main body module measures the distance between the main body module and the ultrasonic wave reception module by using a difference between reception times of the second reference signal and the ultrasonic wave signal transmitted from the ultrasonic wave reception module so as to measure the distance between the first and second ultrasonic wave reception sensors.

18. The position tracing system according to claim 16,
> wherein, in the case where the position of the signal generation device is not to be measured, a housing of the main body module and a housing of the ultrasonic wave reception module are coupled with each other, and
> wherein, in the case where the position of the signal generation device is to be measured, the housing of the main body module and the housing of the ultrasonic wave reception module are detached from each other and disposed so as for detached surfaces to face each other, and the position of the signal generation device is measured.

19. The position tracing system according to claim 16,
> wherein the ultrasonic wave reception module is configured to include:
> the first ultrasonic wave reception sensor;
> an ultrasonic wave generation unit which generates an ultrasonic wave signal;
> a reference signal generation unit which generates a second reference signal for measuring the distance between the ultrasonic wave reception sensors; and
> an ultrasonic wave reception module housing, and
> wherein the main body module is configured to include:
> the second ultrasonic wave reception sensor which receives the ultrasonic wave signal generated by the ultrasonic wave generation unit and the ultrasonic wave signal generated by the signal generation device;
> a reference signal reception unit which receives the reception signal, the first reference signal, and the second reference signal;
> a position measurement unit which measures a distance between the first and second ultrasonic wave reception sensors by using the ultrasonic wave signal and the second reference signal generated by the ultrasonic wave reception module and which measures a position of the signal generation device or generates information for position measurement of the signal generation device by using a difference between reception times of the first reference signal and the ultrasonic wave signal generated by the signal generation device in the main body module and a difference between reception times of the first reference signal and the reception signal in the main body module; and
> a main body module housing which is detachably coupled with the ultrasonic wave reception module housing.

20. A position tracing system comprising a main body module and an ultrasonic wave reception module which are detachably coupled with each other,
> wherein, in the state where the ultrasonic wave reception module is detached from the main body module, the ultrasonic wave reception module allows a first ultrasonic wave reception sensor to receive an ultrasonic wave signal generated by a signal generation device and transmits a reception signal indicating reception of the ultrasonic wave signal to the main body module, and the main body module measures a distance between the main body module and the ultrasonic wave reception module and measures a distance between the first ultrasonic wave reception sensor and a second ultrasonic wave reception sensor which is installed in the main body module to receive the ultrasonic wave signal generated by the signal generation device, and
> wherein the main body module measures a position of the signal generation device or generates information for position measurement of the signal generation device by using a difference between generation time of the reference signal generated by the main body module and reception time of the ultrasonic wave signal generated by the signal generation device receiving the reference signal in the second ultrasonic wave reception sensor and a difference between the generation time of the reference signal and the reception time of the reception signal.

* * * * *